Aug. 14, 1956

H. H. HAMMITT ET AL 2,758,529

ROW CROP MULCHER

Filed April 13, 1953

INVENTORS
HOMER H. HAMMITT
ALLEN W. SHELDON
BY Frank E. Liverance, Jr.
ATTORNEY

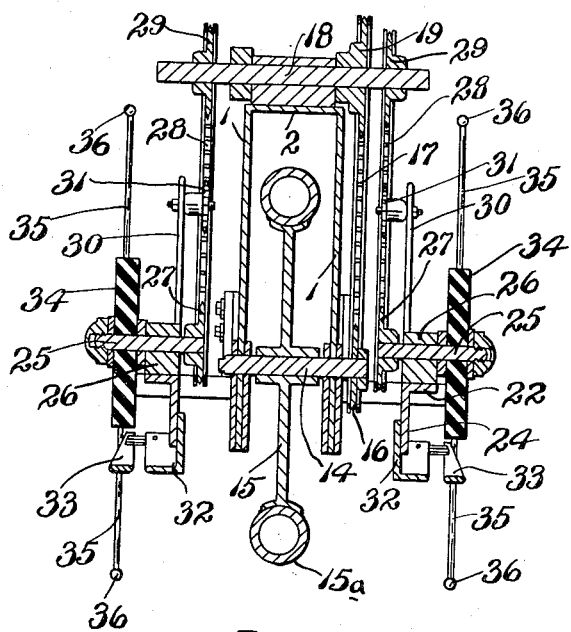

United States Patent Office 2,758,529
Patented Aug. 14, 1956

2,758,529
ROW CROP MULCHER

Homer H. Hammitt, Grant, and Allen W. Sheldon, Newaygo, Mich.; said Hammitt assignor to Douglas Boyd, Erie, Pa.

Application April 13, 1953, Serial No. 348,328

8 Claims. (Cl. 97—35)

The present invention is concerned with a novel, particularly effective and useful row crop mulcher, by means of which strips of the ground, one at each side of and closely adjacent to each row of crops are stirred and agitated and broken up so as to break the conduction of moisture from below the ground upwardly to the surface where it evaporates, such strips of group, one at each side of the rows providing a dry mulch which is a desired attainment in the cultivation of row crops. Between the adjacent strips of two adjacent rows the other ground is dug and cultivated by means of the usual cultivator teeth.

With our invention, crops which are of a tender nature are not harmed or damaged, the weeds which grow adjacent the crop rows are prevented from germinating from their seeds and the maintenance of the crops against weed growing is obtained at a great saving in expense. Many crops of the vegetable variety such as onions, celery and many others generally have required a great deal of hand weeding and cultivation which our invention in a very large measure, and in many cases entirely, eliminates.

It is an object and purpose of the present invention to provide a useful, practical, novel and very effective crop row mulcher, attaining the above enumerated results, as well as many others not at this time stated, but which will appear from the following description of a preferred embodiment of the invention, taken in connection with the accompanying drawings, in which, Fig. 1 is a plan view of the crop row mulcher of our invention.

Fig. 3 is a transverse vertical section substantially on the plane of line 3—3 of Fig. 2 looking in the direction indicated.

Fig. 4 is a fragmentary side elevation of the mulching machine, with the mulching wheel thereof removed, showing the cam which successively operates the radial rods or arms of said wheel as they come to such cam.

Fig. 5 is a fragmentary plan view of such operating cam.

Fig. 6 is a fragmentary plan view illustrative of the action of the arms of the mulching wheel with respect to spaced rows of vegetable or the like, and Fig. 7 is a fragmentary diagrammatic transverse view illustrative of the action of the mulcher with respect to crop rows, at a side thereof.

Like reference characters refer to like parts in the different figures of the drawings.

Figure 1:
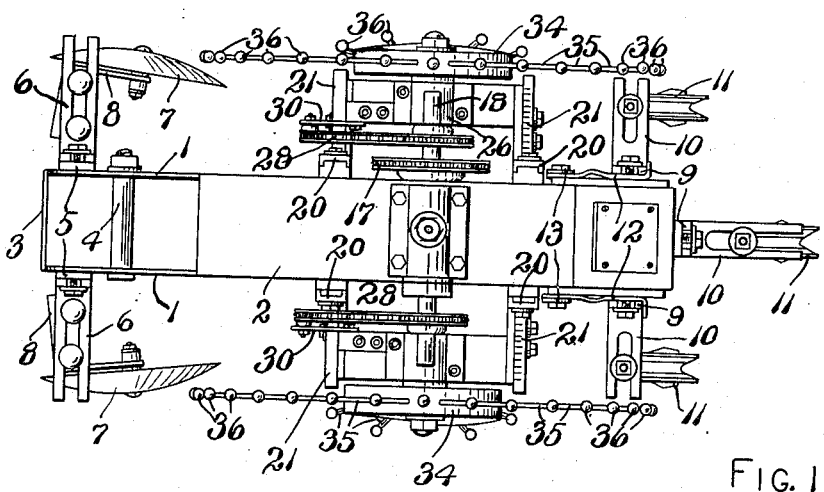
Figure 2:
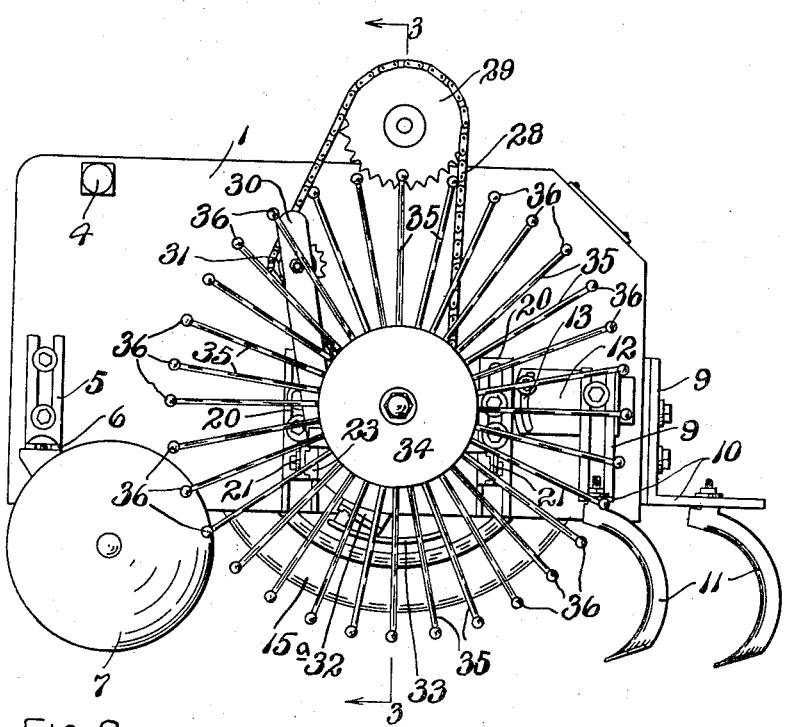
Fig. 2 is a side elevation thereof.

In the structure shown in the drawing illustrating the invention, a central supporting body, preferably made of sheet metal, is used having spaced apart vertical sides 1, an integral horizontal top 2, an integral or vertical welded front end 3, while other edge portions of the sides 1 may be connected together by cross plates of sheet metal. The top 2 and the front 3 are spaced from each other at adjacent edges, leaving an open portion in the front of the body for access to a cross member which may comprise a sleeve 4 mounted on a bolt to which a drawing implement may be connected for pulling the mulcher lengthwise of and between two spaced parallel crop rows.

It is to be understood that the distance that the sides 1 are spaced from each other may be widely varied so that in different models of manufacture of the device the different spacing of rows will be taken care of. However, as will hereinafter appear, with a single dimensional width between the spaced apart sides 1, due to the adjustments which are provided for operating parts of the mechanism, a single model will cover a range of spacings of rows of vegetables or the like within minimum and maximum limits.

To each side 1 at the front thereof, a bracket is adjustably connected having a vertical slotted arm 5 and an integral outwardly extending horizontal arm 6. The vertical arms are adjustably connected to the sides 1 so that the entire bracket may be raised and lowered and secured in any selected position by means of set screws or the like. The horizontal arms 6 have adjustably mounted thereon a disk 7 carried by a bracket 8, the bracket being adjustably shiftable lengthwise of the slots of the arms 6 so that the two disks on opposite sides of the central body are adjustable and adapted to be secured at different distances from each other.

At the rear end of and at each side of the central body a second substantially identical bracket, having a slotted vertical arm 9 and a horizontal outwardly extending arm 10 at the lower end thereof is mounted for vertical adjustments thereon by set screws or the like passing through the slots of the vertical arms 9. Similarly at the rear end of the body which will be closed by a plate similar to the front plate 3, a like vertical arm 9 and an integral slotted horizontal arm 10 is mounted. On each of the arms 10 a cultivator tooth 11 is mounted and may be adjusted within the range provided by the length of the slots in the arms 9 and 10, being adjusted by tightening the nuts on the bolts which pass through said arms. The arms 9 mounted on the sides 1 are preferably each mounted at the rear end of a plate 12, said plate extending forwardly and having an arcuate slot at 13 near its front end through which a set screw passes so that in addition to the side cultivator teeth being vertically adjustable by adjustment of the arm 9, said arm 9 may be tilted about the axis of the set screw which binds it and the plate 12 to the adjacent side 1 of the body.

A rotatable shaft 14 (Fig. 3) extends between and through the lower portions of the sides 1 upon which a traction wheel 15 is mounted fixed to the shaft 14. A pneumatic tire 15a is around the wheel 15 and in practice has a light air pressure within, the tire bearing upon the ground and rotating the shaft and the mechanism (about to be described) connected with the shaft when the mulcher is drawn lengthwise between two rows of plants or the like. At one end of the shaft 14 a sprocket wheel 16 is fixed, driving an endless chain 17 which extends upwardly around a horizontal shaft 18 rotatably mounted on a suitable bearing on and above the top 2 of the body, said chain passing around a sprocket wheel 19 fixed to the shaft 18. At each outer side of the sides 1 of the body of the machine a pair of brackets, each having a vertical slotted arm 20 and a horizontal slotted arm 21 are secured, the brackets at each side of the machine being spaced from each other and the vertical arms being vertically adjustable with respect to the body to different positions.

Between the arms 21 of the brackets at each side of the body of the machine, a horizontal connecting member of metal is located having a leg 22 at its upper edge, horizontal spaced arms 23 at each of its front and rear ends and a downwardly extending flange 24 below leg 22 and between arms 23. The arms 23 are adjustably mounted on the horizontal arms 21 of the described brackets.

At the upper side of each of the said connecting members located between the arms 21, a short horizontal shaft 25 is rotatably mounted in and extends through a bearing 26 secured to the adjacent leg 22. At the inner end of each shaft 25 a sprocket wheel 27 (Fig. 3) is fixedly secured around each of which is an endless chain 28 extending upwardly and around cooperating sprocket wheels 29 adjustably fixed to the shaft 18 adjacent opposite ends thereof. The chains 28 are tightened by arms 30 pivotally mounted at their lower ends on said connecting members and extending upwardly, each carrying a sprocket wheel 31 which engages with its adjacent chain 28. It is evident that such connecting members having the legs 22 and 24 with the shafts 25 and bearings 26 carried thereby may be vertically adjusted and that the chains 28 may be tightened in conformity to the adjustment which is made, it being understood that the lower ends of the arms 30 are pivotally mounted and that after a chain 28 has been tightened, the pivotal mounting which is used may be tightened to fix the arms 30 against change of position.

Secured to and projecting downwardly from the flange 24 of each of the connecting members described is a bracket 32 (Figs. 3 and 4) having an outwardly extending arm or flange to which a cam 33 is adjustably secured by a slotted bar as shown in Figs. 3 and 5. The cams occupying positions below the shafts 25, are of curved form and each at its outer edge has two edge sections, indicated at *a* and *b* in Fig. 5, disposed at an obtuse angle to each other.

A rotatable mulching element is mounted on the outer end portion of each of the shafts 25. Each of such elements includes a hub 34 of yielding resilient material, preferably rubber or a rubber-like composition of disk form, and a plurality of substantially equally spaced rods radially extending therefrom around it, each of which at its outer end terminates, preferably, in a ball-like head or knob 36. The connection between the shaft 25 and the hub 34 is frictional so that if there should be any interference of the turning of the rods 35 by something interfering therewith the shaft 25 can continue its rotative movement with the associated hub 34 remaining at rest. But normally forces sufficiently resisting the turning of the hubs and the radially extending rods are not encountered to thus interfere, so that the hubs with their connected rods rotate continuously with the shafts 25.

In such rotation the radially extending rods 35 come in succession to their associated cams 33 riding first upon the edge *a* of the cam (Fig. 5) and passing therefrom to the edge *b*. In this manner the downwardly extending rods 35, in passing over the cams, progressively are moved outwardly at their lower ends until the cam edge *b* is reached and then progressively returned to the vertical plane of movement in which the greater part of their movement is made. This is with the heads 36 at their lowermost positions and in the operation of the machines with said heads below the upper surface of the ground or about to enter below such upper surface.

With the disks 7 properly adjusted with respect to the mulching wheels, each consisting of hub 34 and the radial rods 35, when the machine is drawn over the ground between two spaced rows 37 of vegetable or other crops or the like, furrows or trenches 38 will be made by disks 7 adjacent each of the rows 37, ahead of the rods 35. The rods 35, as they substantially reach the surface of the ground, are automatically acted upon by the cams 33 to cause the heads to take a path deviating from a vertical plane. That is, the heads entering the upper portion of the trenches or furrows 38 on moving further will move downwardly and also laterally toward the adjacent rows 37 until the maximum lateral movement is reached when a rod passes over the angle between the sides *a* and *b* of the cam and, thereafter, the rods will return to their initial vertical planes of movements accompanied by an elevation thereof. In this way the soil or earth between the outer shoulders of the trenches 38 and the adjacent rows is stirred and cultivated and reduced into broken and divided form, providing a mulch which interposes against loss of moisture from below the mulch reaching the ground surface and evaporating.

It is evident that through the vertical adjustment which may be made with respect to the hubs 34 and their radially extending rods 35 the depth of entrance of the heads 36 into the ground can be controlled, and through the horizontal adjustment of the shafts 25 and the parts carried thereby the closeness with which such heads come to the plants in the rows 37 may be governed. In general the heads 35 will not go into the soil to the depth of the plants. For example, in Fig. 7 in which an onion is illustrated, one in a row thereof, the heads 36 do not reach the onion bottoms and are not brought into complete engagement with the tops thereof, though a quite close approach thereto may be made. It is in the soil above the onion bottom that weed seeds which germinate are located, and as they are in the mulch which is provided by the operation of the machine, are kept from moisture supply so they do not grow. With other plants the heads 36 may stir and mulch the ground above the roots in a comparative manner.

It is to be understood that the generally spherical form of the heads 36 shown and described is not a specifically necessary form. Other shapes of heads may be used, care being taken that they do not have sharp edges or protuberances which would injure plants if they came into contact therewith.

The structure described is exceptionally practical and useful and with it a large amount of hand weeding and other hand work may be greatly reduced. The machine has been used in conjunction with rows of onions but, as before indicated, is not to be restricted in use thereto.

The invention is defined in the appended claims and is to be considered comprehensive of all forms of structure coming within their scope.

We claim:

1. In a machine as described, a support, a mulching wheel rotatably mounted on and at each side of the support outwardly thereof and each rotatable with respect to said support, means to drive the wheels, each wheel having a central hub and spaced radial rods extending therefrom, said rods for each mulching wheel being normally located in substantially vertical planes, and cam means carried by said support at each side thereof below the hubs, against and over which said rods successively pass to first force said rods in succession laterally outward, and then release the rods to return to initial vertical plane positions, combined with means yieldingly resisting movements of said rods from normal vertical position.

2. In a machine as described, a central generally vertically positioned support, a mulching wheel mounted for rotation at each vertical side of the support to turn about a horizontal axis fixed with respect to said support, each wheel comprising, a central disk hub of resilient material and a series of closely spaced radial rods permanently secured to its associated hub normally located in a substantially vertical plane, means to drive said wheels simultaneous with movement of the support over ground, and means carried by the support at each side thereof to which said rods of the wheels successively come and pass by, extending into the paths of movements of the rods, when said rods are extending downwardly from their hubs to force said rods laterally outward from their normal vertical planes of movement, said hubs yieldingly resisting said rod movement, and returning the rods to initial position after passing by said means.

3. In a machine as described, a support adapted to be moved over ground, a mulching wheel rotatably mounted on said support at a side thereof to turn about a horizontal axis, means to drive said wheel said wheel comprising a central hub and spaced radial rods extending therefrom normally located in a substantially vertical plane, means to drive said wheel, and cam means fixed on said support below the wheel hub, to which said rods successively come and pass by, extending into the path of movement of the rods to force said rods laterally outward at their outer ends when the rods come to said ground over which the machine is moved and thereafter release the rods to return to their initial vertical plane.

4. A machine having the elements in combination defined in claim 3, said hub being of resilient material, and said cam means having two generally horizontally located meeting edges at an obtuse angle to each other.

5. A machine having the elements in combination defined in claim 3, said driving means comprising a traction wheel at the lower portion of said support adapted to engage the ground for movement of the machine thereover, and means for driving the mulching wheel from said traction wheel.

6. A machine comprising, a support having spaced generally vertical sides, a disk mounted at a side and outwardly thereof to turn about a horizontal axis and cut a trench in ground over which the machine is moved, a traction wheel carrying said support above and over ground, a mulching wheel mounted to turn about a horizontal axis at the same side of said support as said disk back of the disk, said mulching wheel comprising, a central hub and a successive series of generally equally spaced rods extending radially from said hub, means to drive the mulching wheel from said traction wheel, said rods at their outer ends being adapted to enter the trench made by said disk, and means carried by said support located below the hub of the mulching wheel and extending outwardly into the path of movement of said rods, which the rods successively come to and pass by, for forcing said rods laterally at their outer free end portions and thereafter releasing the rods to return to initial positions, thereby entering and traversing ground at the outer side of said trench.

7. A mulching machine comprising, a support having spaced, generally vertical sides, a rotatable traction wheel carrying said support over ground, a mulching wheel having a hub and elements radially extending therefrom disposed generally in a vertical plane mounted for rotation about a horizontal axis at a side of the support, means for driving the mulching wheel from said traction wheel, and means carried by said support below said hub extending into the path of rotation of said radially extending elements to successively move them laterally outward each a limited distance at their outer ends at the lowermost positions of said elements and to thereafter release them for return to initial position.

8. In a row crop mulching machine, a supporting body having generally vertical sides, a rotatable traction wheel carrying said support over ground, a shaft on which the wheel is mounted, a second shaft on said support, means for driving the second shaft by the traction wheel, a mulching wheel at each side of said body, a shaft for each mulching wheel, means for driving both mulching wheels from said second shaft, each mulching wheel comprising, a hub of resilient material mounted on its associated shaft and frictionally engaging therewith, and a plurality of radial outwardly extending rods normally located in the same vertical plane secured in spaced relation around the hub, and a generally horizontally disposed cam having two vertical edge portions meeting at adjacent ends and located at an obtuse angle to each other carried by said support at each side thereof below said hub and extending outwardly, each into the path of movement of the rods of the adjacent mulching wheel.

References Cited in the file of this patent

UNITED STATES PATENTS

| | | |
|---|---|---|
| 637,840 | Wilkey | Nov. 28, 1899 |
| 1,862,035 | Rainwater | June 7, 1932 |
| 1,908,836 | Forbes | May 16, 1933 |
| 2,054,129 | Kelsey | Sept. 15, 1936 |
| 2,664,040 | Beard | Dec. 29, 1953 |

FOREIGN PATENTS

| | | |
|---|---|---|
| 419,143 | Great Britain | Nov. 1, 1934 |